(12) United States Patent
Brey

(10) Patent No.: US 7,180,409 B2
(45) Date of Patent: Feb. 20, 2007

(54) TIRE TREAD WEAR SENSOR SYSTEM

(75) Inventor: Thomas A. Brey, Lake in the Hills, IL (US)

(73) Assignee: Temic Automotive of North America, Inc., Deer Park, IL (US)

( * ) Notice: Subject to any disclaimer, the term of this patent is extended or adjusted under 35 U.S.C. 154(b) by 160 days.

(21) Appl. No.: 11/078,815

(22) Filed: Mar. 11, 2005

(65) Prior Publication Data
US 2006/0208902 A1 Sep. 21, 2006

(51) Int. Cl.
B60C 23/00 (2006.01)
(52) U.S. Cl. ............ 340/442; 73/146; 116/208; 340/438; 340/454
(58) Field of Classification Search ........ 340/438, 340/454, 442; 116/208; 152/154.2, 152.1; 702/34; 73/146; 701/1
See application file for complete search history.

(56) References Cited

U.S. PATENT DOCUMENTS

| 5,890,061 | A | * | 3/1999 | Timm et al. ............. 455/404.2 |
| 2002/0116992 | A1 | * | 8/2002 | Rickel ...................... 73/146 |
| 2003/0021330 | A1 | * | 1/2003 | Aubel et al. ............... 374/142 |
| 2004/0061601 | A1 | * | 4/2004 | Freakes et al. ............ 340/442 |
| 2005/0057346 | A1 | * | 3/2005 | Ogawa ..................... 340/438 |
| 2005/0110614 | A1 | * | 5/2005 | Coates et al. ............ 340/10.41 |
| 2006/0042734 | A1 | * | 3/2006 | Turner et al. ............ 152/154.2 |
| 2006/0090558 | A1 | * | 5/2006 | Raskas ..................... 73/146 |
| 2006/0124214 | A1 | * | 6/2006 | Bauchot et al. ......... 152/154.2 |

OTHER PUBLICATIONS http://www.sciencedaily.com/releases/2000/09/000911163148.htm, "Sensors Monitor White-Hot Aircraft Brakes", ScienceDaily, Your link to the latest research news, Aug. 11, 2004, p. 1.

* cited by examiner

Primary Examiner—Brent A. Swarthout
(74) Attorney, Agent, or Firm—Brian M. Mancini; Gary J. Cunningham

(57) ABSTRACT

A system and method for monitoring belt wear or tread wear of a tire includes at least one radio frequency identification (RFID) tag with unique identification embedded in the belt or tread of the tire at one or more wear points. An RF tag reader periodically monitoring signals from the at least one RFID tag. If the RF tag reader fails to obtain any signals from the at least one RFID tag, indicating a destroyed RFID tag, the user can be warned about a wear problem of that belt or tire. RFID tags can be distributed at different depths of the tire(s), or across the tread at the same depth, of the tire(s) to determine different wear problems. The same RFID tag can also be used for inventory tracking purposes.

17 Claims, 2 Drawing Sheets

TIRE TREAD WEAR SENSOR SYSTEM

FIELD OF THE INVENTION

This invention relates generally to vehicle tires, and more particularly to an electronic sensor system for tire wear.

BACKGROUND OF THE INVENTION

Vehicle owners nearly always need to deal with maintenance and replacement of wearable parts such as tires and belts. For example, tire maintenance generally involves making sure that the tires have the proper air pressure and do not run too hot, and periodically observing the tread wear, either by visual check of uniform wear, or by direct measurement of tread depth. Uneven wear between tires indicates that a rotation of tires is needed. Uneven wear on one tire indicates that there is a suspension problem with the vehicle. In either case, there is a problem that needs attention. However, the responsibility for this maintenance is often neglected. Without this maintenance, part life is generally shortened, which wastes resources and the consumer's money. Systems have been developed to monitor air pressure in tires. In addition, tires have been developed that can run without any air pressure for short periods of time. However, there have been no automatic systems developed to monitor the wear of parts such as tires and belts.

What is a needed is a system that can automatically monitor the wear of parts on a vehicle. Such a system should be able to detect when a part, such as a belt or tire, is completely worn out. It would also be of benefit if the system could detect uneven wear between tires, which is indicative of the need to rotate tires. It would also be of benefit if the system could detect uneven wear on one tire, which is indicative of a suspension problem. In addition, it would be of benefit if the system could be responsive to external factors relating to tire use.

BRIEF DESCRIPTION OF THE DRAWINGS

The features of the present invention, which are believed to be novel, are set forth with particularity in the appended claims. The invention, together with further objects and advantages thereof, may best be understood by making reference to the following description, taken in conjunction with the accompanying drawings, in the several figures of which like reference numerals identify identical elements, wherein:

DETAILED DESCRIPTION OF THE PREFERRED EMBODIMENT

The present invention provides a system and method that can automatically monitor part condition on a vehicle, such as when a belt or tire is completely worn out. The present invention can also detect uneven wear between tires, which is indicative of the need to rotate tires. The present invention can also detect uneven wear on one tire, which is indicative of a suspension problem. In addition, the present invention can also be responsive to external factors relating to tire use, such as weather conditions and vehicle velocity.

By way of example only, the main controller, clock, RFID tag reader, and radio communication device of the present invention is embodied in a mobile cellular phone, such as a Telematics unit, having a conventional cellular radiotelephone circuitry, as is known in the art, and will not be described in detail here for simplicity. The mobile telephone, includes conventional cellular phone hardware (also not represented for simplicity) such as processors and user interfaces that are integrated into the vehicle, and further includes memory, local area network connections, and the like that can be utilized in the present invention. Each particular electronic device will offer opportunities for implementing this concept and the means selected for each application. It is envisioned that the present invention is best utilized in a vehicle with an automotive Telematics radio communication device, as is presented below, but it should be recognized that the present invention is equally applicable to a portable or fixed hand scanner that can be used in an automotive service facility or tire manufacturer, distributor, wholesaler or retailer.

Figure 1:
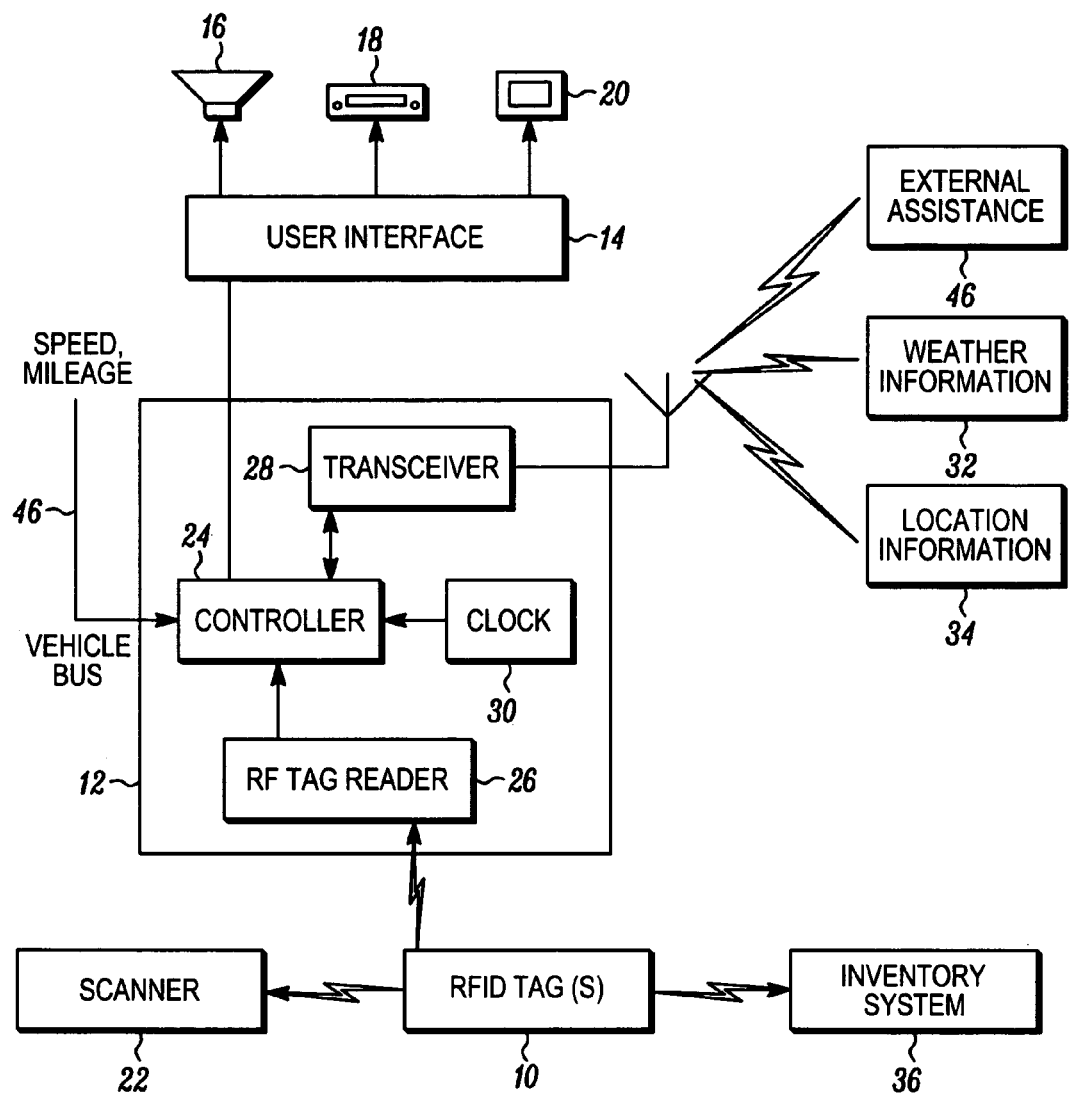
FIG. 1 shows a simplified block diagram for a system, in accordance with one embodiment of the present invention.
Figure 2:
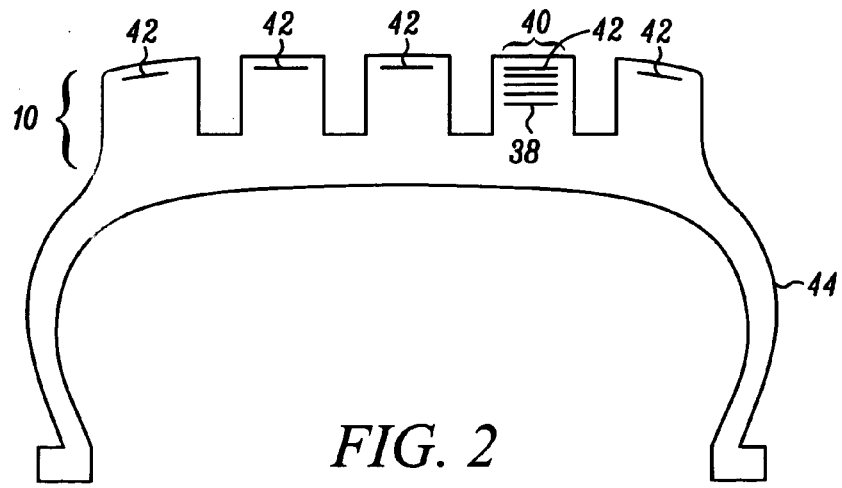
FIG. 2 shows a cross sectional view of a tire embedded with RFID tags, in accordance with one embodiment of the present invention.

FIGS. 1 and 2 show a simplified representation of the system, in accordance with the present invention. A communication device 12 is coupled with a user interface 14. The communication device is coupled with a Radio Frequency Identification (RFID) tag reader 26, which can be externally connected or internal (as shown) to the device 12. The communication device can be an existing Telematics device installed in a vehicle, for example. An existing user interface 14 of the vehicle can be used and can include a loudspeaker 16, text display on a radio 18, or any other display 20, such as a dedication vehicle information display or heads-up display, for example. Alternatively, a separate processor and user interface can be supplied. For example, the communication device can be a scanner 22 with its own user interface, such as a handheld scanner or other dedicated scanner, for use in a service center, warehouse or any other establishment that deals with belts, tires, or other wearable parts such as rubberized parts.

In its simplest embodiment, the present invention utilizes at least one radio frequency identification (RFID) tag 38 with unique identification embedded in the tread of a belt or tire 44 at a depth indicative of a fully worn part (e.g. the lowest acceptable tread depth of a tire). For the example of a tire, the tag 38 can be placed in one or more treads (only one is shown) at a depth even with mechanical tread wear indicators. Similarly, the tag can be placed in a belt at a depth below the wearing surface that would indicate a worn belt. The RFID tag can be constructed with the antenna leads in a co-linear configuration, as is known in the art, to provide a thin profile for ease of tire manufacture and uniform wear monitoring. The RF tag reader 26 can periodically monitor signals from the at least one RFID tag 38. For example, the tag reader 26 can be programmed by a controller 24 coupled thereto to take one reading of all tire RFID tags 10 on the vehicle at start up. Thereafter readings can be taken once per second, for example, until the vehicle is turned off. If the RF tag reader 26 fails to obtain any signals from the at least one RFID tag 10 (38), this would be indicative of a destroyed RFID tag. Presumably, the tag is destroyed by wearing of the tire or belt. However, it is possible that the tag could be prematurely destroyed by road hazards. Therefore, it is preferred that multiple or backup tags be disposed in the tire or belt. These are not shown in the accompanying figures for figure clarity. Where multiple tags are used to detect a wear condition, the controller 24 can use a voting procedure to confirm an accurate wear indication. Moreover, if it is determined that one tag has prematurely failed, that missing reading can be ignored by the controller in the future. A failed RFID tag may not be a problem, if normal wear is encountered. This will be explained in more detail below. Upon identification of a problem, the controller 24 can direct the preferred user interface device 16, 18, 20 to warn a user of the vehicle that the part containing that RFID tag 38 is worn.

Preferably, the system of the present invention is applicable to tire wear, as will be used in the examples below. The system includes a radio communication device such as a transceiver 28 coupled to the controller 24. If the controller determines that a tire is worn, the radio communication device able to obtain external assistance 46 for a user of the vehicle relating to tire replacement, wherein the controller can direct the user interface to provide information to the user about the external assistance. For example, the transceiver can ask for assistance in locating a nearby tire service center. Or the tire wear warning can also be sent to a user's preferred tire service center as a query for tire replacement. Or a query can be sent for potential advertisers who could contact the user back through the transceiver 28 and user interface 14 to provide advertisements for tire service in the location of the vehicle.

The unique identifier for the RFID tags allows the controller to detect signals for all the tires of the vehicle individually. For example, an automotive dealer or service center can record in the controller that RFID tag "A" is located in the left front tire, RFID tag "B" is located in the right front tire, RFID tag "C" is located in the left rear tire, RFID tag "D" is located in the right rear tire, and optionally RFID tag "E" is located in the spare tire, for example. The controller can be reprogrammed as tires are changed or rotated during their service lifetime. Advantageously, the unique identifiers for the RFID tags can also be used with a tire inventory system 36, wherein the unique identification of the at least one RFID tag can be used by the inventory system for inventory tracking, such as at a tire manufacturer, warehouse, distributor, retailer, and service center.

In a preferred embodiment, multiple RFID tags 10 are disposed in the tire tread to detect various tire wear properties. For example, RFID tags 42 that are disposed at the same tread depth across a tire tread can be used to discover uneven wear of a tire, which is indicative of a suspension problem, wherein the vehicle may need a wheel alignment or other service. Similarly, RFID tags 40 that are disposed at the different tread depths in a tire can be used to discover uneven wear between tires on a vehicle, which is indicative of the need for a wheel rotation, for example. To detect problems using multiple RFID tags, it is necessary to monitor when the tags fail.

With a plurality of RFID tags in each tire of the vehicle embedded at different tread depths 40, the controller can monitor the progress of tire wear for each tire by determining when individual RFID tags are destroyed. For example, a clock 30 can be used by the controller to record a time of each failure. If the RFID tags 40 at corresponding tread depths of each tire 44 are not all destroyed within a predetermined time period, the controller 24 can direct the user interface 14 to warn a user of the vehicle that the vehicle is experiencing uneven tire wear, which may require a wheel rotation or other repair.

Alternatively, mileage can be used to determine when RFID tags fail. The controller can read mileage from an existing vehicle bus 46. With a plurality of RFID tags in each tire of the vehicle embedded at different tread depths 40, the controller can monitor the progress of tire wear for each tire by determining when individual RFID tags are destroyed. For example, if the RFID tags at the same corresponding tread depths in each tire are not all destroyed within a predetermined mileage range the controller can direct the user interface to warn a user of the vehicle that the vehicle is experiencing uneven tire wear, which may require a wheel rotation or other repair. Optionally, a combination of both time and mileage can be used to detect this kind of tire wear.

With a plurality of RFID tags in each tire of the vehicle embedded at the same depth 42 across the tread of the tire, the controller can monitor the progress of tire wear for each individual tire by determining when individual RFID tags are destroyed. For example, if the RFID tags at the same tread depth of a tire 42 are not all destroyed within a predetermined time period, determined by the clock 30, the controller can direct the user interface to warn a user of the vehicle that said tire is experiencing uneven tire wear. Such wear is indicative of a suspension problem, such as the need for a wheel alignment.

Alternatively, mileage can be used to determine when RFID tags fail. The controller can read mileage from an existing vehicle bus 46. With a plurality of RFID tags in each tire of the vehicle embedded at the same depth 42 across the tread of the tire, the controller can monitor the progress of tire wear for each individual tire by determining when individual RFID tags are destroyed. For example, if the RFID tags at the same tread depth 42 of a tire are not all destroyed within a predetermined mileage range the controller can direct the user interface to warn a user of the vehicle that said tire is experiencing uneven tire wear. Such wear is indicative of a suspension problem, such as the need for a wheel alignment. Optionally, a combination of both time and mileage can be used to detect this kind of tire wear.

Although FIG. 2 shows a simplified view of RFID tags located together, either across the tread 42 of the tire 44, or stacked in one tread 40, it should be realized that said RFID tags 10 can also be distributed circumferentially around the tire. In addition, back up tags can be located at the same depth locations in the tire for redundancy. Where multiple tags are used to detect a particular wear condition, the controller 24 can use a voting procedure to confirm an accurate tire wear indication. Moreover, if it is determined that one tag has prematurely failed, that missing reading can be ignored by the controller in the future.

The RFID tags 10 can contain more that just a unique identifier. For example, the tags may contain tire build lot information, build date, tire manufacturer, tire model, speed rating, weather rating, load range, pressure range, and the like. This information can be used to further benefit in the present invention. For example, a radio communication device such as a transceiver 28 can be coupled to the controller 24. In this way, the radio communication device is able to download weather information 32 and location information 34 and compare this against a weather rating of the tire in the unique identification of the at least one RFID tag. If the controller determines that the weather rating of the tire is not suitable for the current weather conditions in the location of the vehicle (i.e. snowy conditions using a non-snow tire), the controller 24 can direct the user interface 14 to warn a user of the vehicle that the weather rating of the tire is not suitable for the current weather conditions. Similarly, using the speed indication on the vehicle bus 46 and a speed range rating of the tire, the controller can direct the user interface to warn a user of the vehicle that the speed rating of the tire is not suitable for the current vehicle speed. In addition, using the build date of the tire, the controller can direct the user interface to warn a user of the vehicle that the age of the tire is a problem. Also, the manufacturer, tire model, build date and lot information can be compared against recall information from external assistance 46, and a suitable warning can be presented to the user or contact made back through external assistance 46.

Figure 3:
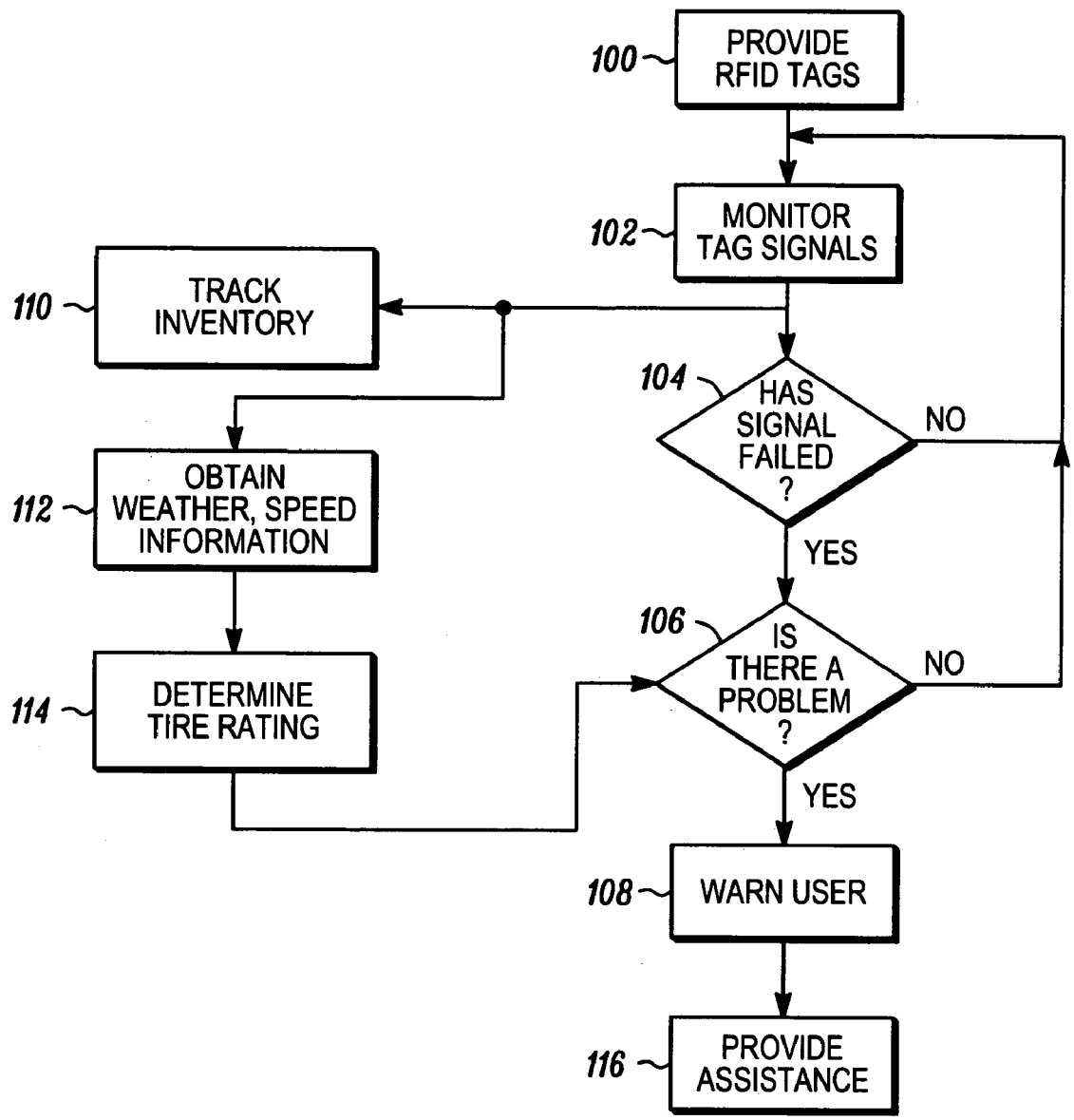
FIG. 3 shows a simplified block diagram of a method, in accordance with the present invention.

Referring to FIG. 3, the present invention also includes a method for monitoring tread wear of a tire of a vehicle that includes a user interface, clock, and mileage indicator. The method includes a first step 100 of providing a plurality of radio frequency identification (RFID) tags with unique identification embedded in the tread of each tire. In its simplest embodiment, the present invention utilizes at least one radio frequency identification (RFID) tag with unique identification embedded in the tread of the tire at a depth indicative of a worn tire. In a preferred embodiment, multiple RFID tags are disposed in the tire tread to detect various tire wear properties. For example, RFID tags that are disposed at the same tread depth across a tire tread can be used to discover uneven wear of a tire, which is indicative of a suspension problem, wherein the vehicle may need a wheel alignment or other service. Similarly, RFID tags that are disposed at the different tread depths in a tire can be used to discover uneven wear between tires on a vehicle, which is indicative of the need for a wheel rotation, for example.

A next step 102 includes periodically monitoring signals from the plurality of RFID tags. For example, a first reading of the signals from all tire RFID tags on the vehicle can be monitored at start up. Thereafter readings can be monitored once per second, for example, until the vehicle is turned off. The unique identifier for the RFID tags allows monitoring of all the tires of the vehicle individually, as detailed above. In addition, the unique identifiers for the RFID tags can also be used to track tire inventories 110, such as at a tire manufacturer, warehouse, distributor, retailer, and service center.

A next step 104 includes detecting when an RFID tag fails to send any more signals, indicating a destroyed RFID tag.

A next step 106 includes determining if the failed RFID tag indicates a problem. It is presumed that the tag is destroyed by tire wear. However, it is possible that the tag could be prematurely destroyed by road hazards. Therefore, it is preferred that the one tag reading is compared to backup tags be disposed in the tire. In this way, a voting procedure can be used to confirm an accurate tire wear indication. Moreover, if it is determined that one tag has prematurely failed, that missing reading can be ignored in the future. A failed RFID tag may not be a problem, if normal tire wear is encountered. This will be explained in more detail below.

A next step 108 includes warning a user of the vehicle of the problem. Several problems can be identified with various RFID tag configurations, as will be presented below. A user can also be provided several solutions 116 depending upon the problem. For example, if it is determined that a tire is worn, an existing radio communication device in the vehicle would be able to obtain external assistance for a user of the vehicle relating to tire replacement, wherein information can be provided to the user about the external assistance. In one example, assistance can be provided in locating a nearby tire service center. Or the tire wear warning can also be sent to a user's preferred tire service center as a query for tire replacement. Or a query can be sent for potential advertisers who could contact the user back through the existing radio communication device to provide advertisements for tire service in the location of the vehicle.

In practice, the providing step 100 includes providing RFID tags embedded at different tread depths in each tire. The monitoring step 102 monitors the progress of tire wear for each tire by determining when individual RFID tags are destroyed. If the detecting step 104 detects that RFID tags at corresponding tread depths of each tire are not all destroyed within at least one of the group of a predetermined time period and predetermined mileage range, the warning step 108 can warn a user of the vehicle that the vehicle is experiencing uneven tire wear.

Additionally, the providing step 100 includes providing RFID tags embedded at the same tread depth across the tread of each tire. The monitoring step 102 monitors the progress of tire wear for each tire by determining when individual RFID tags are destroyed. If the detecting step 104 detects that RFID tags at the same tread depth of a tire are not all destroyed within at least one of the group of a predetermined time period and predetermined mileage range, the warning step 108 can warn a user of the vehicle that said tire is experiencing uneven tire wear.

The RFID tags can contain more that just a unique identifier. For example, the tags may contain tire build lot information, build date, tire manufacturer, tire model, speed rating, weather rating, load range, pressure range, and the like. This information can be used to further benefit in the present invention. For example, weather information and location information can be downloaded 112 and compared against a weather rating 114 of the tire in the unique identification of the at least one RFID tag. If it is determined 106 that the weather rating of the tire is not suitable for the current weather conditions in the location of the vehicle (i.e. snowy conditions using a non-snow tire), the user of the vehicle can be warned 108 that the weather rating of the tire is not suitable for the current weather conditions. Similarly, obtaining a speed indication of the vehicle 112 and a speed range rating 114 of the tire, the user can be warned 108 that the speed rating of the tire is not suitable for the current vehicle speed. In addition, using the build date of the tire, the controller can direct the user interface to warn a user of the vehicle that the age of the tire is a problem. Also, the manufacturer, tire model, build date and lot information can be compared against recall information from external assistance, and a suitable warning can be presented to the user or contact made back through external assistance.

Advantageously, the present invention provides a system and method that can automatically monitor part condition on a vehicle, such as when a tire is completely worn out or there is uneven wear of tires. In this way, if a motorist neglects normal tire inspection and maintenance, tire conditions can be captured before they become a problem. The present invention can also use tire information to inform a motorist of conflicting external conditions. Lastly, the present invention provides a technique to assist a motorist with tire related problems.

While the present invention has been particularly shown and described with reference to particular embodiments thereof, it will be understood by those skilled in the art that various changes may be made and equivalents substituted for elements thereof without departing from the broad scope of the invention. In addition, many modifications may be made to adapt a particular situation or material to the teachings of the invention without departing from the essential scope thereof. Therefore, it is intended that the invention not be limited to the particular embodiments disclosed herein, but that the invention will include all embodiments falling within the scope of the appended claims.

What is claimed is:

1. A system for monitoring wear of a vehicle part, comprising:
    a user interface;

at least one radio frequency identification (RFID) tag with unique identification embedded in the part at a depth indicative of a worn part;
an RF tag reader that can periodically monitor signals from the at least one RFID tag;
a controller coupled to the RF tag reader and user interface, wherein if the RF tag reader fails to obtain any signals from the at least one RFID tag, indicating a destroyed RFID tag, the controller can direct the user interface to warn a user of the vehicle that the part containing that RFID tag is worn; and
a clock coupled to the controller, and wherein the at least one RFID tag includes a plurality of RFID tags in each tire of the vehicle embedded at different tread depths, wherein the controller can monitor the progress of tire wear for each tire by determining when individual RFID tags are destroyed, wherein if the RFID tags at corresponding tread depths of each tire are not all destroyed within a predetermined time period the controller can direct the user interface to warn a user of the vehicle that the vehicle is experiencing uneven tire wear.

2. The system of claim 1, wherein the part is a tire and the at least one RFID tag includes one RFID tag for each tire of the vehicle.

3. The system of claim 1, further comprising an inventory system, wherein the unique identification of the at least one RFID tag can be used by the inventory system for inventory tracking.

4. A system for monitoring wear of a vehicle part, comprising:
a user interface;
at least one radio frequency identification (RFID) tag with unique identification embedded in the part at a depth indicative of a worn part;
an RF tag reader that can periodically monitor signals from the at least one RFID tag;
a controller coupled to the RF tag reader and user interface, wherein if the RF tag reader fails to obtain any signals from the at least one RFID tag, indicating a destroyed RFID tag, the controller can direct the user interface to warn a user of the vehicle that the part containing that RFID tag is worn; and
a mileage indicator of the vehicle coupled to the controller, and wherein the at least one RFID tag includes a plurality of RFID tags in each tire of the vehicle embedded at different tread depths, wherein the controller can monitor the progress of tire wear for each tire by determining when individual RFID tags are destroyed, wherein if the RFID tags at corresponding tread depths of each tire are not all destroyed within a predetermined mileage range the controller can direct the user interface to warn a user of the vehicle that the vehicle is experiencing uneven tire wear.

5. The system of claim 1, further comprising a clock coupled to the controller, and wherein the at least one RFID tag includes a plurality of RFID tags in each tire of the vehicle embedded at the same depth across the tread of the tire, wherein the controller can monitor the progress of tire wear for each tire by determining when individual RFID tags are destroyed, wherein if the RFID tags at the same tread depth of a tire are not all destroyed within a predetermined time period the controller can direct the user interface to warn a user of the vehicle that said tire is experiencing uneven tire wear.

6. The system of claim 1, further comprising a mileage indicator coupled to the controller, and wherein the at least one RFID tag includes a plurality of RFID tags in each tire of the vehicle embedded at the same depth across the tread of the tire, wherein the controller can monitor the progress of tire wear for each tire by determining when individual RFID tags are destroyed, wherein if the RFID tags at the same tread depth of a tire are not all destroyed within a predetermined mileage range the controller can direct the user interface to warn a user of the vehicle that said tire is experiencing uneven tire wear.

7. A system for monitoring wear of a vehicle part, comprising:
a user interface;
at least one radio frequency identification (RFID) tag with unique identification embedded in the part at a depth indicative of a worn part;
an RF tag reader that can periodically monitor signals from the at least one RFID tag;
a controller coupled to the RF tag reader and user interface, wherein if the RF tag reader fails to obtain any signals from the at least one RFID tag, indicating a destroyed RFID tag, the controller can direct the user interface to warn a user of the vehicle that the part containing that RFID tag is worn; and
a radio communication device coupled to the controller, the radio communication device able to download weather and location information, and wherein the unique identification of the at least one RFID tag includes a weather rating of the tire, wherein if the controller determines that the weather rating of the tire is not suitable for the current weather conditions the controller can direct the user interface to warn a user of the vehicle that the weather rating of the tire is not suitable for the current weather conditions.

8. The system of claim 1, further comprising a radio communication device coupled to the controller, the radio communication device able to obtain external assistance for a user of the vehicle relating to tire replacement, wherein the controller can direct the user interface to provide information to the user about the external assistance.

9. A system for monitoring tread wear of a tire of a vehicle, comprising:
a user interface in the vehicle;
a clock in the vehicle;
a mileage indicator in the vehicle;
a plurality of radio frequency identification (RFID) tags with unique identification embedded in the tread of each tire;
an RF tag reader located in a vehicle carrying the tire, the RF tag reader can periodically monitor signals from the plurality of RFID tags; and
a controller coupled to the clock, mileage indicator, RF tag reader and user interface, wherein if the RF tag reader fails to obtain any signals from the at least one RFID tag, indicating a destroyed RFID tag, the controller determines if there is a problem and then directs the user interface to warn a user of the vehicle that the tire containing that RFID tag is experiencing a problem, wherein the plurality of RFID tags include RFID tags embedded at different tread depths, wherein the controller can monitor the progress of tire wear for each tire by determining when individual RFID tags are destroyed, wherein if the RFID tags at corresponding tread depths of each tire are not all destroyed within at least one of the group of a predetermined time period and predetermined mileage range the controller can direct the user interface to warn a user of the vehicle that the vehicle is experiencing uneven tire wear.

10. The system of claim 9, further comprising an inventory system, wherein the unique identification of the RFID tags can be used by the inventory system for inventory tracking.

11. The system of claim 9, wherein the plurality of RFID tags include RFID tags embedded at the same depth across the tread of each tire, wherein the controller can monitor the progress of tire wear for each tire by determining when individual RFID tags are destroyed, wherein if the RFID tags at the same tread depth of a tire are not all destroyed within at least one of the group of a predetermined time period and predetermined mileage range the controller can direct the user interface to warn a user of the vehicle that said tire is experiencing uneven tire wear.

12. The system of claim 9, further comprising a radio communication device coupled to the controller, the radio communication device able to download weather and location information, and wherein the unique identification of the at least one RFID includes a weather rating of each tire, wherein the if the controller determines that the weather rating of the tire is not suitable for the current weather conditions the controller can direct the user interface to warn a user of the vehicle that the weather rating of the tire is not suitable for the current weather conditions.

13. The system of claim 12, further comprising a vehicle speed indication coupled to the controller, wherein the if the controller determines that the vehicle is traveling above a predetermined speed, given the weather rating of the tire and current weather conditions, the controller can direct the user interface to warn a user of the vehicle that the vehicle is going too fast for the current weather conditions.

14. A method for monitoring tread wear of a tire of a vehicle that includes a user interface, clock, and mileage indicator, the method comprising the steps of:
providing a plurality of radio frequency identification (RFID) tags with unique identification embedded in the tread of each tire;
periodically monitoring signals from the plurality of RFID tags;
detecting when an RFID tag fails to send any more signals, indicating a destroyed RFID tag;
determining if the failed RFID tag indicates a problem; and
warning a user of the vehicle of the problem,
wherein the providing step includes providing RFID tags embedded at different tread depths in each tire, wherein the monitoring step monitors the progress of tire wear for each tire by determining when individual RFID tags are destroyed, wherein if the detecting step detects that RFID tags at corresponding tread depths of each tire are not all destroyed within at least one of the group of a predetermined time period and predetermined mileage range the warning step can warn a user of the vehicle that the vehicle is experiencing uneven tire wear.

15. The method of claim 14, further comprising the step of tracking an inventory of tires using the unique identification of the RFID tags.

16. The method of claim 14, wherein the providing step includes providing RFID tags embedded at the same tread depth across the tread of each tire, wherein the monitoring step monitors the progress of tire wear for each tire by determining when individual RFID tags are destroyed, wherein if the detecting step detects that RFID tags at the same tread depth of a tire are not all destroyed within at least one of the group of a predetermined time period and predetermined mileage range the warning step can warn a user of the vehicle that said tire is experiencing uneven tire wear.

17. The method of claim 14, wherein the unique identification of the plurality of RFID tags in the providing step includes a weather rating of each tire, and further comprising the steps of:
obtaining weather and location information;
determining that the weather rating of the tire is not suitable for the current weather conditions; and
warning a user of the vehicle that the weather rating of the tire is not suitable for the current weather conditions.

* * * * *